3,024,128
METHOD OF COATING METAL ARTICLE
WITH HARD PARTICLES
Chester H. Dawson, Butte, Mont., assignor, by mesne assignments, to Dawson Armoring Company, Danbury, Conn., a corporation of Delaware
No Drawing. Filed Nov. 14, 1955, Ser. No. 546,779
21 Claims. (Cl. 117—22)

The present invention relates to the art of producing improved armored metal articles with a thin hard film made in situ and conforming to the exact contour of the underlying surface and, more particularly, to an improved method of armoring a selected surface of a metal article with a thin, flat, hard wearing surface of smooth and uniform character and of uniform thinness containing particles of a diamond substitute and conforming to the exact contour of the selected surface. Such an improved method of armoring involves a novel combination of operations as will be described more particularly hereinafter and, generally speaking, includes the following operations:

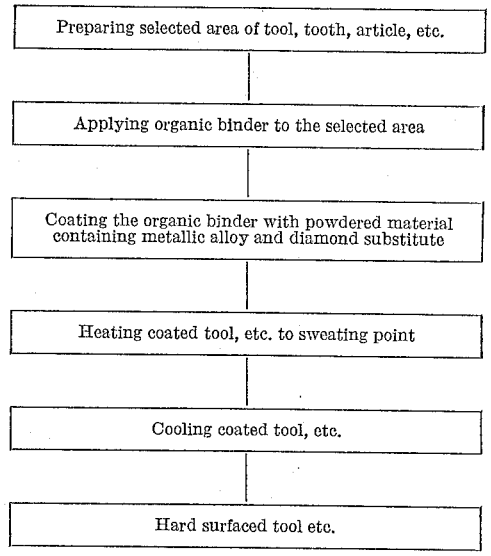

Heretofore, it has been customary in the art to apply to certain tools a hard wearing surface on one or more sides. As those skilled in the art know, this prolongs the life of the tool many-fold, since it not only wears more slowly, but the hard surface can be restored after it has been worn down. Depending on its shape and use, a cutting tool may deteriorate on the underside, i.e., the base metal. When the wear continues practically to completion, then practically no base remains on which a hard surface can be restored. This is much less likely to be true where it is used as a bearing surface instead of a cutting tool. While results heretofore attained in actual practice in the art have been an improvement over tools without such surfaces, these prior results have not been all which could be desired. For example, it has been very difficult and impossible for practical purposes to apply a uniform thin layer of hard metal to the surface which receives the wear and still obtain a uniformly adequate bond through the interface. As a result, it has been customary to apply a relatively thick layer having a thickness of about 1/8 of an inch or more and constituted of hard metal to the tool surface and grind off the excess of hard metal. Inasmuch as the surface to be ground is very hard, this grinding operation is difficult and expensive. When it is necessary to produce a thin layer, especially of hard material, very painstaking precision in the making and fixturing of the base of the metal article is required. It is necessary to refixture to permit grinding just enough to produce a thin layer and not to grind through the layer. The harder the overlay, the harder it is to maintain the abrasive wheel and its relation to the thinness of the layer. Some distortion occurs during grinding but probably much more during brazing and heat treatment, which would make it practically impossible to maintain the correct relation between the base surface and the grinding wheel and to grind a thin, even layer, thus necessitating the use of a thicker layer. Due to the use of a thicker layer, there is a tendency to become spherical and much more material must be used to produce a coated article with square corners after grinding and still have an overlay on them. A thin layer is desired because a thick layer on a cutting tool causes a heel to form whereas a thin layer allows the clearance to be maintained. Due to the interfacial alloying, the as-produced overlay would be hardest on the surface. When it becomes necessary to grind the surface, the best part of the overlay is destroyed. The extent of interfacial alloying depends on the heating time or time at or above melting. Moreover, the bond obtained between the hard surface layer and the main body of the tool often has not been strong enough or has not been uniform with the result that there have been certain instances of the hard coating chipping off or being sheared away during use. Furthermore, the hard layer as applied was bumpy and for this reason also had to be ground down to a smooth surface. Although attempts were made to overcome the foregoing difficulties and other disadvantages, none, as far as I am aware, was entirely successful when carried into practice commercially on an industrial scale.

It is an object of the present invention to provide an improved method of applying a hard wearing layer to a selected surface of a metal article to provide a thin hard armor.

Another object of the invention is to provide an improved method of armoring metal articles with a thin hard film made in situ and conforming to the exact contour of the underlying surface.

The invention also contemplates providing an improved method of armoring a selected surface of a metal article with a thin hard wearing surface of smooth and uniform character containing particles of a diamond substitute and substantially conforming to the exact contour of the selected surface.

It is a further object of the invention to provide an improved method of applying in situ a hard wearing surface to a tool made of a ferrous metal.

The invention further contemplates providing an improved method of applying a hard wearing surface to a selected area of a metal article which requires no subsequent grinding and which can be used in the as-produced condition.

It is another object of the invention to provide an improved method of forming a hard wearing coating on a metal article, which is relatively free from tendency to chip off or shear off during use, and of forming a hard wear-resisting surface on an internal surface having only a small opening.

Still another object of the invention is to provide an improved method of applying in situ to a selected area of a tool a hard wearing layer which is self-sharpening during use.

It is likewise within the contemplation of the invention to provide an improved method of armoring metal articles in situ with a hard wearing coating which is thin, which has a relatively smooth, hard surface when initially applied, and which can preserve and conform to square corners of the internal and external types.

It is also the purpose of the invention to provide an improved method of applying a hard wearing coating to a metal article which can be more quickly, easily and inexpensively applied than by prior methods.

Among the further objects of the present invention is the provision of an improved method of applying in situ to a metal article a hard wearing coating, layer, skin, glaze or enamel which results in a substantial saving of materials over prior methods, which is particularly valuable for armoring tools, which involves an exact control of metal to be applied, which obtains a firm controlled penetration forming a tenacious bond between the face of the article and the hard coating, which permits the retention by diamond substitutes of their effectiveness even during and after heat treatment, which enables coated tools to be heat treated without substantial loss of hardness of the hard bonded coating, and which maintains the hardness of the armor even in service and even when heated in use up to red heat.

In accordance with the present invention, an improved method is provided for applying in situ a hard refractory surface containing diamond substitutes to metal articles, such as, for example, ferrous tools in a novel manner. The hard refractory surface is thin and when applied by the present method, it almost conforms exactly to the shape of the article, such as a tool. It is likewise a sufficiently smooth surface so that for many purposes no smoothing operation is necessary. Generally, no grinding is required to re-shape the tool. Moreover, the hard refractory surface material and base metal fuse, melt and/or sinter at the interface, thereby giving an excellent bond and obviating most of the danger of chipping and shearing while at the same time retaining the hard surface containing the diamond substitute. When hard refractory or diamond substitute particles are of the carbide type, for example, and the base metal is of the ferrous type, for example, the constituents are soluble in the matrix alloy and thus provide an excellent bond at the interface. An armored tool, for instance, having an applied hard refractory surface, after subsequent normal heat treatment for the tool as if unarmored, has a finished surface apparently unaffected by the heat treatment.

Generally speaking, the present invention contemplates providing a thin, flat, hard armor on a metal article such as a ferrous tool made usually with a base of steel, iron or cast iron. The metal article is first cleaned to produce a metallic surface to which the armor will adhere tenaciously. After cleaning, the article or a selected surface or surfaces thereof has a film of liquid adhesive applied thereto. Such an adhesive film is then coated with a thin layer or coating of metal powder ground or granulated through a wide range of mesh, such as 5, 10, 20, 30, 40 or 50 down to 100, 200, 300 or 325 mesh. Powders of this kind can be obtained on the market or can be milled as those skilled in the art know. Metal powder for this process must soften or become plastic over a wide range of temperatures as in the illustrative examples disclosed herein and must not melt quickly and run away from the surface, particularly those which are sloped, inclined, vertical, irregular, internal, external, etc. As mentioned hereinafter, any excess powder is removed from the article or the surface being armored. After the removal of the excess, the remaining powder is held or retained tightly by the adhesive. Such remaining powder constitutes a thin film which represents a single layer. The coated article is preferably dried in any appropriate manner well known to those skilled in the art. When the article is dried, it is then ready to be heated in order to produce the permanent armor on the surface under treatment. During such heating, the dried adhesive is volatilized and is replaced or displaced by the matrix constituent of the powder constituting a coating alloy which forms a permanent fusion bond between the armor and the surface of the article.

The temporary adhesive or binder has a volatile liquid vehicle, such as water, alcohol, mixtures thereof, or the like which can be volatilized and dried readily. Such an adhesive or binder can contain suitable ingredients like shellac and borax. As those skilled in the art know, borax is a non-volatile, non-metallic, inorganic adhesive material which has plastic holding properties at the fusion bonding temperature of the matrix.

As illustrated in the examples, Stellite constitutes the matrix of the armor which is fusion bonded to the article. When a diamond substitute is included in the armor, a carbide or carbides of refractory metals can be used such as one sold under the trade name Haystellite. For special purposes, cutting diamonds or the like may be used as those skilled in the art appreciate.

It will be obvious to those skilled in the art that the operations, adhesives or binders, metal powders, etc., can be varied. For instance, the liquid adhesive which is first applied as a film to the article may comprise a volatile liquid such as alcohol and shellac dissolved therein. The metal powder can be composed of a great variety of metallic materials as noted herein. Borax or a similar ingredient can be applied as a solution in water in the form of a film over the coating of metal powder after the removal of the excess. Before heating, it is preferred to dry the coated article. If the main heating is performed in such a manner as to include appropriate drying, then a separate drying operation is not needed. Instead of applying a separate film of borax powder or of a boron-containing solution, such as boric acid and/or a borax flux, the borax, boric acid or mixtures thereof can be incorporated in the metal powder. Borax or other appropriate flux can be applied as a powder over the coating before heating. In other words, it can be applied as an overcoat. Naturally, such a powder should be mixed very thoroughly before applying in order to obtain best results.

The heating may be conducted in any suitable manner. A welding torch is a very convenient way but is only suitable for small production. When larger production is desired, suitable furnaces with appropriate atmospheres can be used. For instance, oil or gas fired furnaces of the muffle type, muffle furnaces, or electrically heated furnaces can perform satisfactorily. Under such conditions of heating, protective atmospheres, such as a reducing one, must be employed. For fast production, induction heating has been found to be satisfactory, even without a protective atmosphere.

In carrying the invention into practice, it is preferred to sprinkle metal powder onto the article coated with a film of adhesive or binder. Such sprinkling can be done manually and/or automatically with the aid of mechanical and/or electrical devices. For instance, a curtain of falling metal powder being quite uniform and controllable can be supplied by an electro-magnetically vibrated feeder. The speed at which the article or piece is passed through the curtain would also tend to allow a controlled amount of the material to fall on the surface to be coated. Moreover, the amount retained is also controlled by the thickness of the adhesive film and the size of the metal particles. In order to get a substantially uniform thickness, the surface can be held in a horizontal plane and passed under a thin curtain of powder falling from an electro-magnetically vibrated feeder. Any wetted surface can be placed in the horizontal plane and only the parts that have been wetted will retain the falling powder. In this manner, I have coated the teeth of a ferrous tool, like a file, the points of the teeth on the file being the only parts that were wetted when the file was blotted on a blotter soaked with adhesive. The file was held at such an angle that the clearance side of the teeth were tipped down a little past the horizontal so that the metal powder or grains would not get lodged at the base of the teeth or on the forward side of the teeth. A chain saw guide plate was tically impossible in a convenient manner to do the underside of an article and very difficult to do the sides. Minute contours are almost impossible to follow, especialy sharp corners, thin projections, etc. Still another prior method involves coating a surface with refractory grains and then heating it very rapidly to produce tungsten carbide on the surface of the base metal, such as steel. (See, for example, U.S. Patent No. 1,824,166.) Tungsten or a tungsten-containing material is mixed with carbon and applied to the surface with an adhesive. By use of some instantaneous method of high heat, such as by an arc, the tungsten-containing material is reduced by the carbon and tungsten functions like finely divided tungsten and reacts with carbon to form tungsten carbide which sinks into the molten surface of the base metal caused by the instantaneous application of the heat. In general, it takes an appreciable time and/or temperature above the melting point of the steel constituting the ferrous tool to form tungsten carbide in appreciable quantities. If the temperature were raised above the melting point of the steel, it would obviously be impossible to reproduce the contour of the part with accuracy. Any attempt to use the high temperature required would need an atomic hydrogen arc which would inevitably melt the sharp cutting edges to be armored. These operations are difficult to carry into practice on an industrial scale for commercial production. Another disadvantage of these operations is that they produce a very uneven coating, burn-off sharp edges, etc. A further prior method involves electroplating of hard chrome on the surface of the metal article. The hard chrome was for the purpose of prolonging the life of a tool. However, the chrome-plated article did not hold an edge and the coat was not thick enough to provide strength required for a built-up edge to form when the steel wears away. A still further prior method involved metal spraying. In metal spraying, no fusion bond is formed. The bond is merely mechanical and does not possess the strength and the properties required for practical operations. It would be difficult to get a uniform coating on an irregular shaped piece. Even on a simple shape as a saw bit having three sides, it would be difficult without expensive mechanical aids to coat the three surfaces with the same thickness. It would be impossible to treat an interior surface having only a small opening. For example, a hollow drill with ¼" or ⅜" hole. The prior art also used briquetted and sintered pieces or inserts and sold them under such trade names as Carboloy. The inserts were brazed to tools. The disadvantages are: first, high cost due to the larger amount of expensive material and the greater labor required to make and install them; and second, the thicker insert is not self-sharpening. When resharpening is necessary, it is much easier to work the present armored article. Although grinding is preferred, the present armored articles can be filed to sharpen them. This is made possible by the extremely thin coating made by the present invention. The prior inserts brazed to tools might be used on earth scarifiers, etc.

In contrast with the prior art, the present invention provides an improved method of armoring a selected surface of a metal article with a thin, flat, hard wearing surface of smooth and uniform character and of uniform thinness containing particles of a diamond substitute and conforming to the exact contour of the selected surface. The armor or hard facing comprises a hard matrix, such as Stellite, martensitic iron, nickel boride or equivalent, containing hard refractory or diamond substitute particles, such as tungsten carbide or the like. The coat of armor is extremely thin, such as about 0.002" to about 0.005". In exceptional cases, the coat can have thinnesses up to about 0.015". The thin coating of armor accurately reproduces the underlying contour including irregularities, square corners, etc. All prior coats made the corners round. The new invention contemplates the provision of a liquid binder which tends to flow evenly over the article or piece being armored, and to form a thin film on the selected area. Such a film retains a uniform thinness of metal powder comprising matrix alloy and hard refractory particles when the powder is dusted or sprinkled over the article or piece. Most prior hard-facing processes fail to provide means for obtaining a uniform thickness. Consequently, the prior processes cannot be used where accurate reproduction of a contour is to be effected. Armor can be applied to internal slots, holes, etc., by the present invention whereas prior processes requiring a torch or electrode for heating could not be used for such purposes. On cutting tools, the improved method applies armor to the flank instead of on the face as is effected by most prior hard-facing processes. The armoring of the flank allows the tool to be sharpened many times without removing the armor. By armoring the flank only, wear on the face of the tool sharpens the cutting edge of the armor. Such flank armoring of tools makes it much easier to sharpen them as the amount of carbide to remove is relatively small due to the thinness of the armor coating. The extremely thin coat of armor applied by the present invention makes it possible to restore the corner of a tool by swaging. This is impossible with thicker coats of armor applied by prior processes.

The present application is a continuation-in-part of my co-pending United States application for Method of Applying a Hard Surface to a Ferrous Tool, Serial No. 379,100, filed September 8, 1953, and now abandoned, which is a continuation of my parent application, Serial No. 41,180, filed July 28, 1948, and now abandoned.

Although the present invention has been described in conjunction with preferred embodiments, it is to be understood that modifications and variations may be resorted to without departing from the spirit and scope of the invention, as those skilled in the art will readily understand. For instance, instead of a ferrous base for the tool or metal article, non-ferrous bases can be used, such as copper bases (brasses, bronzes, etc.) or nickel bases or cobalt bases or molybdenum bases or the like. Instead of the shellac solution, other suitable organic adhesive or binder materials can be used. For example, appropriate solutions containing natural or synthetic rosins and/or resins, such as Glyptals, silicones, phenol-formaldehyde resins of the Bakelite type, Cycopols (sold by Oliver Johnston Paint Company), Lustrex or Lytron or Lauxite (sold by Monsanto Chemical Company). Varnish, lacquer or tung oil may be used. Solutions of sodium silicate may likewise be substituted. Instead of borax, other equivalent materials may be employed, such as borax or borate-containing materials, boric acid, sodium or potassium fluoborate, sodium or potassium fluoride, sodium silicate, and lithium salts such as fluoride, metaborate or tetraborate. As those skilled in the art know, the melting points of these fluxes vary up to about 1500° F. to about 2000° F. Similarly, the operations can be varied. Thus, the metal powders and fluxes can be added to the solution of adhesive or binder, dipping, brushing, spraying or otherwise painting the adhesive or binder solution on the entire or selected area, drying the solution to form a dried coating, and finally, heating the armor coating surface with a welding torch to fuse the armor coating to metal base. On the other hand, the surface to be armored can be painted with binder or adhesive solution and then powdered refractory particles of diamond substitutes, such as tungsten carbide, can be sprinkled onto the film of adhesive. Thereafter, powdered material including a matrix alloy such as Stellite, a flux such as borax and optionally a carbohydrate can be sprinkled over the surface to surround the particles of diamond substitutes. The coated metal article can be dried and then subjected to heating with appropriate means, such as a welding torch, to fuse the matrix and bond the armor coating to the metal base. Another variant is to sprinkle all powdered materials on together. Instead of improved method producing novel armored metal articles having thin coatings of the order of about 0.001" or 0.002" to about 0.004" or 0.005", being very hard and flat and having fairly smooth surfaces and straight edges suitable for cutting edges which will outwear conventional coated metal articles and which will provide comparatively permanent self-sharpening or edge-retaining characteristics.

Unusual characteristics are produced in armored metal articles by the present method and includes armor which follows or conforms to the contours, curves, square corners or other variations or irregularities in the shape of the article, which can be spotted or patterned as desired, which is bonded or fused to the parent metal of the base and thus eliminates chipping or spalling under normal conditions of service, which withstands bending, swaging and metal treating cycles and which retains its hardness and alloyed bond.

The present invention contemplates a heat treatment process for armoring a metallic base with a metallic material having at least in part a melting point lower than the melting point of the base, which comprises, wetting the surface of the area to be covered with a liquid composition having the property of disintegration as an incident of the process and of a consistency such that it spreads evenly and at a uniform thickness on such surface upon contact therewith, coating the wetted surface with the armor material so finely powdered that it adheres readily thereto in a thin layer having the contour of the surface, at least a part of said armor powder having the property when melting of bonding with the base, and quickly raising by ambient heat the temperature of the armor powder to the melting point to remove the wetting composition and melt the armor powder onto the base in a self-conforming fused layer of uniform thickness throughout.

It is likewise within the contemplation of the invention to provide a process for armoring a metallic article surface, comprising applying to said surface a thin liquid film of a binder material having a consistency such that it coats evenly all parts of the surface and having a composition such that it adheres thereto, is chemically inert to the material of the surface and to the material of the armor, is compatible with all operating conditions of the process, and dissipates as an incident thereof; applying to the binder coating a fine powder comprising a hard metal and a matrix forming material which latter has a melting point below the melting point of said surface material and below the melting point of the hard metal and which has the property when melting of bonding with both, continuing the application of the powder until sufficient powder adheres to the binder to reproduce thereon exactly the entire area and contour of the surface beneath the binder, removing excess powder, and furnace heating the powder coated article to dissipate the binder and melt the matrix material so that it bonds to said surface and to the hard metal forming therewith a hard layer exactly reproducing the entire area and contour of the underlying article surface.

The invention also provides a process for armoring a metallic tool having on the area to be covered a plurality of faces merged in relatively sharp corners, which comprises, wetting the entire surface of the area to be covered with a liquid composition decomposable by heat and of a consistency such that it flows evenly thereon upon contact to provide a binder film that retains the exact configuration of the surface of the area which it covers, powdering the applied binder with a fine powder comprising an armor material which adheres to the binder in a thin layer conforming precisely to the configuration of the surface beneath the binder, at least a part of said armor material having a melting point lower than the melting point of the material constituting the surface to be covered but proximate the decomposing, dissipating, etc. temperature of the binder and having the property when melting of bonding with said surface material, and heating the powdered surface to decompose the binder and melt the powder directly upon the underlying surface evenly in a surface-bonded layer replacing the binder and thereby, to the same degree as the binder, retaining the configuration of the underlying surface.

It is to be observed that in carrying the invention into practice, the size of the metal powders can be varied. The powders sold on the market by different manufacturers have different sizes of mesh. For preferred armoring, it is preferable to use metal powders having a size varying from about 100 mesh (about 0.0059" or about 149 microns) to about 200 mesh (about 0.0029" or about 74 microns). In general, metal powders can be used varying in size from about 20 mesh (about 0.0331" or about 840 microns) or 30 mesh (about 0.0234" or about 590 microns) to about 325 mesh (about 0.0017" or about 44 microns). In some instances, coarser particles may be present, say about 4 mesh (about 0.187" or about 4760 microns), as well as finer particles, say of flour fineness, such as obtained in conventional "bag" powders. Too many fines should not be included in the metal powder as they tend to cause balling-up in lumps on the surface of the liquid adhesive and to interfere with free and uniform feeding by the Syntron Feeder. An appropriate amount of fines can be included in the metal powder and will be distributed or dispersed between the coarser or larger particles. When so distributed, especially as a single layer, the particles tend to hold the liquid adhesive close to and in contact with the surface of the article to be armored. Generally, the liquid adhesive including a flux like borax surrounds and/or envelops the particles, although some of the coarser or larger particles may extend beyond or project through the liquid film, especially hard refractory particles such as tungsten carbide or some other diamond substitute.

The present invention is not to be confused with old inventions in the prior art. Thus, an alloy rod interdispersed with diamond-substitute granules or a tube rod filled with diamond substitute granules is held above the surface to be coated and a molten mass flowed on by means of heat, such as provided by a torch or electric arc. (See, for example, U.S. Patents Nos. 1,650,905; 1,757,601; 1,803,875; and 2,033,594.) This prior method lacks control of thickness of surface and distribution of diamond substitute granules. It cannot precisely follow the contour of the surface. This is particularly true where unprotected square corners are rounded and melted off due to the difficulty of controlling the heat of the welding torch. Ripple marks are likewise left on the surface when hand welding with an electric torch is used. When working from a rod or tube with a torch, it is practically impossible to melt an even amount from the supply end of the rod and spread it uniformly over several different unit areas in the thinness tolerance contemplated by the present invention. In fact, the degree of precision involved in producing a uniform surface on the novel armored metal article is so much greater than that made, intended or required for use by the old tube method that this old method is entirely different from the present improved method of armoring. When it becomes necessary to smooth the surface as by grinding, the best part of the coating is ground away. Another method involves the distribution of refractory grains or particles onto a surface brought up to the sweating temperature. See, for example, U.S. Patent No. 1,733,241.) The surface to be coated is heated until a very thin layer of the base metal becomes molten. Before this molten surface has an objectionable amount of oxides formed, the diamond substitute granules are distributed or dispersed over the molten area. They sink in and cause the base metal to be bonded thereto. With this old method, the conditions under which the distribution is done require so much skill that it is very costly for industrial production and that it can only be used for certain situations. It is pracarmored around the edge having no unwanted armor in the milled slot. The edge of the guide was rolled against the blotter and then rolled over the plane containing the powder. Instead of a blotter, any suitable porous material can be used, such as a sponge, impregnated sheet, rubber, cellular plastic and the like. The metal article or piece can be pressed or rolled against the porous material carrying the adhesive or binder. By using a roll made of rubber, metal, sponge and the like and cut out so as to contact the metal article only at selected spots or areas, a desired or selected pattern can be applied to the surface. This operation might be termed printing adhesive on the metal article. In both of the foregoing cases, an overcoat of flux was added.

The present invention provides a simple way of applying a uniform layer of approximately the thickness of the larger grains of powder used. However, there have to be preferably enough larger grains present to be distributed over the surface sufficiently to allow the smaller grains to fall into place between them. The article is held at such an angle that the first grains falling get stuck to the adhesive while the rest of the powder falls off with the exception of the smaller particles which fall in between the larger particles. Many articles can be armored with powders having about 100 to about 200 mesh. For smoother coats, finer powders are included. In effect, when the proportion of the sizes of the particles is selected appropriately, a very thin flat, uniform surface is formed. When the particle sizes come as crushed, ground, and sieved metal powder from the largest size desired down to the finest size desired, one has a more or less natural piling of the grains. This mixture of powder is fairly uniform and convenient for handling. Of course, the excess powder is removed before heating, or the next operation.

In practical operations, the article is held in such a way that the surfaces to be coated are held preferably at an angle so that when the falling powder hits the surface, only a part adheres to the adhesive and the rest just slides over the surface and falls into a container for re-use. In this manner, no more than about one grain thickness adheres to the article or piece when the grains are wetted by the adhesive. When the article or piece is passed under the second curtain containing the flux, the adhesive has had a chance to wet the grains and soak up to the free surface so that the flux will adhere. The surface is wet with adhesive or binder when flux is applied which then adheres to the surface. Since the metal powder is falling in a curtain and the angle at which the surface to be coated is held permits the excess powder to slide by, practically no problem of "piling up" is involved. Too many fines in the metal powder tend to cause pollution of the air and do not allow the magnetic feeder to feed at its best and, therefore, are preferably to be avoided.

For the purpose of clarity and simplicity, the present invention will now be described as applied to insert saw teeth, although it will readily be apparent that it is equally applicable to other tools which are benefited by a hard surface. For example, the present invention is applicable to all kinds of tools including solid saw teeth, band saws, chain saws, harrow teeth, harrow discs, mower bar sections, scarifiers, plow shares, planter points, wood drill bits, rock drill bits, hog and chipper knives, tillage steels, pump impellers, coke crushers, internal combustion engine valves, and bearing surfaces generally. Where a bearing surface requires absolute smoothness, a small amount of grinding may be necessary, though this is much less than required on hard layers applied by previous methods. For instance, now practically no grinding or a negligible amount thereof is required whereas previously it was necessary to grind about 50% to about 75% of metal applied. The present method can be used to produce a great variety of metal articles, especially iron and steel tools, used in many industries including metal-working, mining and wood-working industries and including automotive, agriculture, brick, cement, coke and gas, excavating, glass, iron and steel, lumber and paper, machinery, mining, oil and gas, power, sugar, etc., as those skilled in the art will fully appreciate. In these industries, various parts are armored including wear and heat-resistant parts, abrasion and corrosion-resistant parts, percussion and impact parts, etc.

In utilizing the present invention for the production of an improved armored insert saw tooth, an insert saw tooth is first treated with an alcoholic solution of shellac, the solution being applied to the entirety of the tool or to a selected area or portion of the surface on which the hard layer is desired. As those skilled in the art know, a shellac solution is well known in the paint art. The solution may be applied in any desired manner, as by dipping, brushing, spraying, or the like as is well known to those skilled in the art of painting. The insert saw tooth coated with the alcoholic solution of shellac in place is then treated with a powdered mixture containing the components for the hard surface; namely, one or more of the diamond substitutes plus borax. The use of a carbohydrate is optional and may be used, if desired. The coated surfaces of the tooth are then heated as by an oxyacetylene torch using a carburizing flame until the "sweating point" of the base metal as coated is reached, whereupon the matrix or brazing alloy becomes soft, plastic and/or fluid but not so fluid as to run off or away from the surface being coated and whereupon there is a bonding or fusion of the surface layer and the ferrous base of the tool by melting or fusing at the interface. The heating is continued until the matrix or brazing alloy starts to melt, at which temperature, the matrix dissolves both the iron of the ferrous base and the carbide of the hard refractory particles. When a good bond is insured at the interface, the heating is discontinued. By "sweating point," I mean the point at which the metal becomes glazed or enameled indicating that an extremely thin surface has softened or melted or become plastic or fluid. When the metal becomes glazed or enameled, the metal of the surface layer and the ferrous base is fused, melted or otherwise bonded. In this manner, the surface layer becomes in situ a coating, skin, glaze or enamel tenaciously bonded to a metal article, such as a ferrous tool made of a steel, semi-steel, iron, cast iron or the like. In practical operations, the armored metal article can be used in the as-produced condition with no subsequent grinding or only a negligible or small amount thereof, if no heat treatment is used. As those skilled in the art know, articles such as ferrous tools require heat treatment under certain circumstances.

A convenient way of applying the powder mixture to the surface is to pass the tooth through a curtain of the powdered material which is falling from one elevation to another, as by use of a Syntron magnetic feeder. As those skilled in the art know, a Syntron magnetic feeder operates by vibrating a trough carrying the metal powder. By adjusting the vibrations, the flow of powdered material in the form of a falling curtain of powder can be varied from a trickle to a heavy flow. The trough is mounted on flexible leaf springs and is vibrated at high speed by an electromagnet. The magnet, energized by pulsating currents, pulls the trough sharply down and back and the leaf spring returns it up and forward to its original position, although not as sharply as the downpull. The powdered material in the trough falls perpendicularly as the trough is pulled sharply backwards out from under it, to a new position forward in the trough. The same action is repeated at high speed. This vibrating action causes the material in it to flow like water. The Syntron vibrating feeder provides an efficient and economical way of feeding powdered material and causing it to fall like a curtain of powder. By adjusting the vibrations, the rate of flow of the powder can be simply and easily controlled. By the use of the Syntron, coating surfaces of articles with metal powder can be conducted on a large scale for mass production of armored metal articles commercially. Such an operation is like sieving the powdered material through a screen and sprinkling the falling material on the surface of the tooth or metal article to be coated. In large quantity production, this operation is very facile and efficient. A typical powder for this purpose may consist of a mixture of powdered Stellite, powdered Haystellite (tungsten carbide), and powdered borax and/or boric acid preferably with a halide, such as a chloride and/or fluoride, like sodium, potassium or calcium chloride and/or fluoride and/or zinc chloride, etc. The matrix is a hard metal alloy having a substantial plastic temperature range between the liquidus and solidus points below the melting point of the metal article or tool to be coated and within a temperature range of the order of about 1500° F. (for instance 1700°, 1800° or 1900° F.) to about 2500° F. (for instance, about 2000°, 2100°, 2200°, 2300° or 2400° F.) comprising essentially cobalt, chromium, tungsten and carbon and has a softening or plastic range somewhere within the range of about 1900° F. or 2000° F. to about 2300° F. or 2400° F. The shellac solution holds the powder mixture in place on the surfaces upon which coating is desired until the point where the borax performs the holding action. The shellac-alcohol mixture is subjected to pyrolysis by the heating operation which causes the volatile constituents to evaporate and/or to burn to produce products of combustion, such as carbon monoxide, carbon dioxide, etc., with any residual constituents remaining as a carbonaceous residue, after which the borax and/or boric acid protects the grains of the Stellite in the coating and the surface of the base metal of the article or piece being treated.

The function of the reducing flame is described in general in U.S. Patent No. 1,973,341.

It is to be understood that the improved process embodying the present invention may be utilized with other types of heating than the oxyacetylene flame by maintenance of a reducing or carburizing atmosphere, by the use of a carbohydrate or a reducing or carburizing gas or both, and the application of heat by some means, such as induction heating. When a substantial period of time of heating is employed, a reducing, carburizing or non-detrimental atmosphere is used, but when the heating is short or momentary or even almost instantaneous as in induction heating, then no special atmosphere has to be used.

Tungsten carbide, in the diamond substitute component of the powdered mixture, is not melted when heated to the sweating temperature of the base metal as coated and the unmelted tungsten carbide particles are thus interspersed in the molten surface and prevent the melted portions of the coating material from coalescing and forming an appreciable curved surface or large sphere or drop. In this manner, a relatively flat, smooth surface of uniform thinness is provided on the surface of the coated metal article, such as a tool. The smoothness of the surface depends, among other things, upon the size of carbide particles, the time of heating above the plastic range or fusion zone or melting or softening point or range of the brazing metal or alloy, the solution of any carbide in the matrix metal or alloy, the fluxing, the smoothness of the initial coating, etc.

When a tool such as a tooth is being coated, it is permitted to cool and it will be found that the surfaces to which the powdered mixture was applied now have a hard wearing surface which reproduces the contour of the underlying base and which is thin, practically smooth and firmly bonded to the remainder of the tooth. This thin hard surface, layer or coating may be termed a glaze, a skin or an enamel. No grinding at all is required for use and in use the tooth is substantially free of any tendency for the hard surface layer to chip off or be sheared away. In the foregoing manner, an armored tooth is produced in situ and is ready for service in the as-produced condition. In service operation the tooth is self-sharpening since the softer underside wears away gradually from the top surface layer leaving a sharp edge.

In lieu of the combination of Stellite and Haystellite referred to above, Stellite alone may be used, but a close control of temperature is required. However, for saw teeth the combination is preferred, since Haystellite gives a harder surface than Stellite, while Stellite in the combination favors a smooth surface. Moreover, when tungsten carbide is present and when the matrix or brazing alloy like Stellite begins to melt, the carbide dissolves in the melt and immediately raises the melting point, thus keeping the matrix in a plastic state.

It is to be understood that for various applications of this invention any of the diamond substitutes or refractory particles, known to the art, such as the carbides of silicon, tungsten, molybdenum, chromium, tantalum, columbium, vanadium, titanium, hafnium, and zirconium may be used, as the purpose for which the tool is to be used shall dictate. Of course, in place of carbides, borides, nitrides, silicides and the like may be used singly or in mixtures as those skilled in the art understand. The melting points or ranges of the foregoing or mixtures thereof vary from about 3000°–4000° F. to about 6000°–7000° F. as known to those skilled in the art.

In lieu of the Stellites, pure chromium and cobalt in very finely powdered form can be used in combination with tungsten carbide and a carbohydrate to form the hard surface. In this case, carbides of certain of the constituents are formed from the carbon of the carbohydrate and by the action of the torch and a slower heating should therefore be employed than is necessary where prepared carbides are used. Tungsten carbide is preferably employed rather than pure tungsten.

For the purpose of giving those skilled in the art a better understanding of the invention, the following illustrative examples are given:

EXAMPLE I

An alcohol-shellac mixture of the following composition is prepared:

| | Percent by weight |
|---|---|
| Orange shellac | 3.75 |
| 80% denatured alcohol | 96.25 |

The shellac and alcohol are mixed to form a solution of the foregoing composition which is like those used in the paint art having a paint consistency and which is applied by dipping. As a general rule, it is preferred to add sufficient liquid, such as alcohol, to the liquid binder to make it thin so as to function like a liquid.

A powder mixture having the following compositions is formed:

| | Percent by weight |
|---|---|
| Flux | 11.4 |
| Stellite | 32.6 |
| Haystellite | 55.9 |

The powder contains particles having a range of sizes from about 100 mesh (about 0.0050" or 0.0059") to about 200 mesh (about 0.0025" or 0.0029"). The metallic components of the powder mixture constitute a non-eutectic type of alloy forming the matrix and having a substantial plastic or softening temperature range between the liquidus and solidus points below the melting point of the metal article and within a wide temperature range, such as somewhere within a range of about 1500° F. to about 2500° F., say, for instance, about 1600°–1800° F. to about 2200°–2400° F. The tooth with its surface coating of shellac-alcohol solution is passed through a fine curtain of the powdered material so as to coat the top and sides of the cutting portion of the tooth with the powdered material. The moistened tooth retains only a thin, uniform layer of the powdered mixture; the outer side of said layer being dry allows the excess powdered material to fall off or to be shaken or jarred off. This effects a removal of the excess of powdered or granulated coating mixture or alloy so that substantially a single layer is retained by the binder or adhesive film on the surface of said tooth or metal article. When the binder or adhesive is made of shellac solution, the viscosity of this solution must be taken into consideration with respect to the thinness of the film of adhesive and the layer of metal powder.

The saw tooth with the powdered layer held in place by the shellac solution, which dries rapidly, is heated after drying with a reducing flame of an oxyacetylene torch to the sweating temperature, i.e., one which is above the melting or softening point or range of the brazing or matrix material whereupon there is a fusion at the interface of the surface layer and the ferrous base of the tool by melting or fusing or bonding. In this heating operation, the surface of the saw tooth is heated to a temperature within the aforesaid plastic range at which said coating alloy will displace said non-metallic adhesive material (for example, borax and/or boric acid and/or mixtures thereof) and will fusion bond with the surface of said saw tooth or other tool or metal article. The shellac binder is subject to pyrolysis during heating and the flux, which is preferably borax in part, takes over the function as binder and holds the carbide grains of the Stellites in place and protects them from oxygen. Borax functions as a non-volatile, non-metallic inorganic binder or adhesive material with plastic holding properties at the fusion bonding temperature. A smooth thin hard layer is formed on the surfaces treated so as to accurately reproduce its contour. It is tightly bonded to the remainder of the tooth and requires no grinding operation. The tooth can be heat treated just as though the surfacing had not been applied and will substantially retain its hardness.

As indicated hereinabove, the composition of the final surface layer should be determined by the conditions of use to which the article will be subjected. For example, where the shock which the tool is to meet is not too great, silicon carbide or boron carbide are preferably included. Such a product is particularly useful for abrading surfaces.

An insert saw tooth manufactured in accordance with the foregoing example has a hard thin surface which is self-sharpening during use, unless the tooth is chipped or broken by contact with rocks or foreign substances in dirty timber when it may require some sharpening; has a relatively smooth, hard surface when initially applied requiring no grinding on the coated surfaces prior to use; is produced by a method more quickly, easily and inexpensively applied than by methods heretofore known; wears from two to twenty times as long as saw teeth which have not been hard surfaced; may be heat treated without rupturing the bond between the ferrous tool and the hard surfacing; retains during normal heat treating of the ferrous tool the desirable quality of hardness of the hard surfacing; is relatively free from tendency to chip or shear off the hard surfacing during use; and is created by a process resulting in a substantial saving of materials over methods previously known. Of course, the proper cutting angle should be maintained on the cutting tool, such as a tooth, especially when it is worn and/or when it is restored. This is accomplished by grinding on the face in a manner well known to those skilled in the art.

EXAMPLE II

The proportions set forth in the foregoing Example I can be varied, but are preferably of the following order.

Wet portions: Percent by weight
Orange shellac _____ 2 to 4
80% denatured alcohol _____ 96 to 98

Dry portion:
Powdered sugar (optional) _____ 0.05 to 0.5
Borax (flux) _____ 5 or 10 to 10 or 15
Stellite (matrix) _____ 30 to 40
Haystellite (diamond substitute) _____ 50 to 65

The dry portion is composed of powder having a size range varying from about 20 mesh (about 0.030″ or 0.033″) to about 300 mesh (about 0.001″ or 0.0017″). The matrix or brazing metal powder may likewise vary from about 30 mesh (20 microns) to about 325 mesh (44 microns). Of course, the flux is screened to obtain the same size range.

In lieu of borax together with calcium chloride and zinc chloride, or either together with borax, a suitable commercial borax mixture is sold as Oxweld Brazo Flux. Analysis shows this flux consists of a borax mixture containing boric acid. The constituents of the flux give fluidity to the heated materials, tend to lower the melting point of the high melting oxides, and provide protection against unwanted oxidation. As those skilled in the art know, a flux functions in a number of ways including covering or enveloping the surface or surfaces to protect them from oxidation by the atmosphere while heating, dissolving any oxides formed on the metallic surface or surfaces, and lowering the surface tension of the molten, softened or plasticized matrix to allow it to flow or spread sufficiently to coat all adjacent parts, surfaces and/or particles and to form a fusion bond at the interface of the metal base and the armor or coating.

The temperature and humidity at the time of application will affect the proportion of alcohol in the shellac solution. Too little alcohol will result in balling up of the material on the surface of the tool to be coated and will result in an uneven application of the hard surfacing material. As well understood by those skilled in the art, the alcohol acts as a liquid vehicle.

Other carbohydrates such as molasses and syrup may be substituted for the powdered sugar, although sugar is preferred. Glue may be substituted for the shellac but does not seem to work quite as well. The temporary binder must be of a composition which does not decompose into volatile constituents too quickly. Molasses, syrup, or the like may also act as an adhesive with or without the shellac solution.

EXAMPLE III

Wet portions:
Shellac, alcohol or shellac solvent _____ Suitable proportions to form liquid adhesive to be applied by spraying, dipping, brushing or other ways known to the painting art.

Dry portions:
Diamond substitutes __ Coarse granules (about 10, 20 or 30 mesh).
Diamond substitutes __ Finer granules (about 200, 300 or 325 mesh).
Stellite _____ Matrix alloy.
Flux _____ Borax mixture containing boric acid.

*The first operation.*—Article is coated with a film of shellac solution by any desired method known to the art of painting.

*The second operation.*—Distribute coarse granules of a diamond substitute of a size that the thinness requires over the adhesive covered surface or surfaces in any desired pattern in order to get a substantially even distribution.

*The third operation.*—Distribute a fairly coarse size of matrix granules over the coarse granules of the diamond substitute. This will cause a lesser amount of matrix to fall between the coarse diamond substitute granules so that after fusing and bonding the coarse granules will protrude slightly.

*Alternative to third operation.*—A mixture of 100 mesh and finer or any grain size required by the finished article of matrix alloy and diamond substitute which would fill up the spaces between the coarse granules of the diamond substitute and cause less protrusion of the diamond substitute.

*The fourth operation.*—Overcoat the entire coating with a flux like borax which will function as a binder or adhesive until the matrix softens or fuses and becomes plastic.

A very thin coating of shellac solution should be applied before each operation if there is any evidence of insufficient wetting by the shellac solution previously applied.

EXAMPLE IV

The proportions set forth in Example III will be used and some practical selected patterns will be utilized.

*Pattern "A"*

On a saw tooth, a row of a diamond substitute of coarse granules may be placed at intersections between back clearance surface and side surfaces of tooth. Then the surfaces would be coated in the regular manner, permitting the regular coating to also cover the coarse granules. This would cause better maintenance of corners in service since the center (i.e., the space between the coarse granules) would tend to wear back instead of protruding as it does now. During the life of the tooth, the period would be considerably lengthened before it needed reshaping.

*Pattern "B"*

In scarifiers where abrasion is great and clearance is impaired rather rapidly, a row of coarse granules may be put along the leading edge of the clearance and each successive row may be of a smaller grain size as it follows back on the clearance.

The reason for arranging the granules in this manner is that the smaller grains in back will not be dislodged and the undercutting of the face will be more pronounced. It will have a tendency to maintain a shape that is desired for service operation.

It is to be observed that the present invention provides an improved process resulting in a saving of appproximately 50 to 75% of the hard surfacing material over the customary coating processes because the resultant layer is produced in situ and is very thin. This is because the coating applied by the present invention requires no grinding for many purposes, whereas the previous coatings were applied thickly and ground down. Moreover, for many applications of the invention no grinding machinery is required. Furthermore, the novel armored metal articles can be embodied in ferrous tools, such as wood or light metal cutting tools requiring relatively high precision in reproducing the underlying contours, etc., whereas prior cutting devices, such as earth scarifiers or the like, did not require this high precision.

It is also to be observed that the present invention provides an improved armored metal article, such as a ferrous tool, having a thin, hard, flexible coating, layer, film, skin, glaze, enamel or the like which has a thinness of about 0.001, 0.002 or 0.003 of an inch to about 0.005, 0.006 or 0.007 of an inch, which has a fusion or interfacial bond located or interposed between the surface of the metal article and the coating and possessing tenaciousness and toughness capable of sustaining intense loads, which conforms exactly to the shaping of a regular or irregular underlying surface including horizontal, inclined and vertical surfaces and sharp corners, which has continuity of coverage over the selected coated area to be covered, and which possesses hardness and wear resistance even at high temperatures.

It is manifest that the present invention provides an improved method of armoring metal articles, such as ferrous tools, which involves, generally speaking, (1) the coating of the article with a temporary liquid binder composition which spreads evenly over the surface and which is dissipated by the heat of the process, (2) the application of a metallic facing powder over the film of liquid binder to which it adheres, and (3) the heating of the coated article which eliminates the temporary liquid binder and which effects a bonding of the powder to the article.

It is likewise to be noted that the temporary binder (for example, shellac solution and a flux like borax, etc.) to be used in carrying the invention into practice is chemically inert or non-detrimental to the piece or metal article to be armored and to the armor material, is dissipated or otherwise removed by the heat of the process, is compatible with all operating conditions of the process, is a liquid which flows evenly over the entire surface upon contact, is sufficiently adhesive to support the powder and remain even on vertical surfaces while supporting the powder and is of such a nature that it continues to function until the powder particles and/or the surface of the article become sufficiently tacky under the heat to cause sticking or adherence of the particles even to a vertical surface, etc., without any further aid of the temporary binder.

Furthermore, the invention contemplates the use of a matrix material which has a melting or fusing point or softening or plasticizing range lower than the melting or fusing point or range of the piece or article and lower than the melting or fusing point or range of the hard metal portion of the armor including refractory particles, diamond substitutes etc. (if the matrix alone is to provide the armor it need only be more wear resistant and have a lower melting point than the base), which has a melting point or range at substantially the temperature at which the binder (for example, shellac and a flux like borax, etc.) disappears, decomposes or is dissipated and which has the property when melting of bonding both to the piece or article and to the hard metal.

Moreover, the invention has within its contemplation the use of refractory hard metals, such as diamond substitutes and the like, in conjunction with the matrix, which provides a hard wear surface, which has a melting point higher than the melting point of the piece or metal article, and which does not appreciably lessen in hardness as a result of the heating used for the usual bonding operation.

It is clear that the present invention provides a method for controlling the properties of the armored metal article, such as thinness, hardness, abrasion resistance, corrosion resistance, surface smoothness, and the like or combinations of these properties, and such properties are controllable within reasonable limits both by appropriate formuation and suitable variation of the operations and by subsequent heat treatment.

Likewise, it is within the contemplation of the invention to use various powders having a variety of degrees of fineness so long as the powder is not so coarse that it slurs or does not conform accurately to the entire surface formation of the area to be armored within limits determined by the satisfactory operation of the finished part, article or the use for which it is intended. Such a powder can be applied to the surface wetted with the liquid temporary binder in a variety of ways, if it insures that the coating of powder conforms accurately to the underlying surface formation. The powder can be applied to the wetted surface in the form of a coating, layer, film, skin, glaze or enamel having various degrees of thinness so long as it is not too thin to provide a serviceable armor covering the entire area of the selected surface or too thick to preserve in the completed armor an accurate reproduction of the underlying surface formation.

The invention also contemplates the provision of an a welding torch, an electric furnace can be used for heating with a controlled atmosphere, such as dissociated ammonia. The latter heating operation can be varied by adding methane (CH₄) or natural gas to the dissociated ammonia atmosphere. Still another variant is to heat with an electric induction heater in the air with or without a protective atmosphere. The powdered materials can be put on the adhesive film on the article separately. For instance, the diamond substitute can be applied first, the brazing or matrix alloy second, and the flux third. The powder comprising the brazing or matrix alloy can be put on first, then the diamond substitute and finally the flux. Of course, various other combinations can be used including the application of several coats with or without additional films or layers of adhesive. Such modifications and variations are considered to be within the purview and scope of the invention and appended claims.

I claim:

1. The method of applying to a selected portion of a ferrous tool a hard surface conforming to the shape of said tool which comprises first applying to said portion of the tool a liquid organic binder having the property of adhesion and then a layer of powdered material over the binder, said material being held in place by the liquid organic binder, said material comprising a metallic matrix and a carbide selected from the group consisting of the carbides of silicon, tungsten, molybdenum, chromium, tantalum, niobium, vanadium, titanium, zirconium, and boron, and then heating the coated tool surface while in contact with a carburizing atmosphere at a temperature and for a period of time sufficient to reach the sweating point of the base metal as coated, whereupon there is a fusion of the matrix of the surface layer and said ferrous tool portion at the interface, and thereafter allowing said coated tool portion to cool whereby said carbide component and said tool are tightly bonded together.

2. The method of applying to a selected portion of a ferrous tool a hard surface conforming to the shape of said tool which comprises applying to said portion of the tool a shellac solution and a layer of powdered material, said material being held in place by the shellac solution, said material comprising borax, a metallic matrix and a carbide selected from the group consisting of the carbides of silicon, tungsten, molybdenum, chromium, tantalum, niobium, vanadium, titanium, zirconium, and boron, and then heating the coated tool surface while in contact with a carburizing atmosphere at a temperature and for a period of time sufficient to reach the sweating point of the base metal as coated, whereupon there is a fusion of the matrix of the surface layer and said ferrous tool portion at the interface, and thereafter allowing said coated tool portion to cool whereby said carbide component and said tool are tightly bonded together.

3. The method of applying to a selected portion of a ferrous tool a hard surface conforming to the shape of said tool which comprises applying to said portion of the tool a shellac solution and a layer of powdered material, said material being held in place by the shellac solution, said material comprising a carbohydrate, borax, a metallic matrix, and a carbide selected from the group consisting of the carbides of silicon, tungsten, molybdenum, chromium, tantalum, niobium, vanadium, titanium, zirconium, and boron, and then heating the coated tool surface while in contact with a carburizing atmosphere at a temperature and for a period of time sufficient to reach the sweating point of the base metal as coated, whereupon there is a fusion of the matrix of the surface layer and said ferrous tool portion at the interface, and thereafter allowing said coated portion to cool whereby said carbide component and said tool are tightly bonded together.

4. The method of applying to a selected portion of a ferrous tool a hard surface conforming to the shape of said tool which comprises applying to said portion of said tool an alcoholic solution of shellac and then passing said tool through a curtain of powdered material, said material being held in place by the shellac solution, said material comprising a hard metal alloy consisting substantially of cobalt and chromium and in which cobalt is the major constituent, tungsten carbide, borax, calcium chloride and zinc chloride, and a carbohydrate, and then heating the coated tool surface while in contact with a carburizing atmosphere at a temperature and for a period of time sufficient to reach the sweating point of the base metal as coated, whereupon there is a fusion of the hard metal of the surface layer and said ferrous tool portion at the interface and thereafter allowing said coated tool portion to cool whereby said powdered material and said tool are tightly bonded together.

5. The method of applying to a selected portion of a ferrous tool a hard surface conforming to the shape of said tool which comprises applying to said portion of said tool an alcoholic solution of shellac and then passing said tool through a curtain of powdered material, said material being held in place by the shellac solution, said material comprising a hard metal alloy containing cobalt and chromium, tungsten carbide, borax, calcium chloride and zinc chloride, and a carbohydrate, and then heating the coated tool surface while in contact with a carburizing atmosphere at a temperature and for a period of time sufficient to reach the sweating point of the base metal as coated, whereupon there is a fusion of the hard metal alloy of the surface layer and said ferrous tool portion at the interface, and thereafter allowing said coated tool portion to cool whereby said powdered material and said tool are tightly bonded together.

6. The method of applying to a selected portion of a ferrous article a hard surface conforming to the shape of said article which comprises applying to a surface of said portion of the article a liquid organic binder having the property of adhesion and a layer of powdered material over the binder, said material being held in place by the liquid organic binder and said material comprising a metallic matrix and a carbide selected from the group consisting of the carbides of silicon, tungsten, molybdenum, chromium, tantalum, niobium, vanadium, titanium, zirconium and boron, heating the coated surface to a temperature and for a period of time sufficient to reach the sweating point of the base metal as coated whereupon there is a fusion of the matrix of the surface layer and the surface of said ferrous article at the interface, and thereafter allowing said coated article to cool whereby said carbide component and said tool are tightly bonded together.

7. The method of applying to a selected portion of a ferrous tool a hard surface conforming to the shape of said tool which comprises applying to said portion of the tool a liquid organic binder containing shellac and a layer of powdered material, said material being held in place by the organic shellac binder and said material comprising borax, a metallic matrix and a carbide selected from the group consisting of the carbides of silicon, tungsten, molybdenum, chromium, tantalum, niobium, vanadium, titanium, zirconium, and boron, heating the coated tool surface while in contact with a protective atmosphere at a temperature and for a period of time sufficient to cause pyrolysis of the organic shellac binder, to fuse the borax and to reach the sweating point of the base metal as coated whereupon there is a fusion of the matrix of the surface layer and said ferrous tool portion at the interface, and allowing said coated tool portion to cool whereby said carbide component and said tool are tightly bonded together.

8. The method of applying to a selected portion of a ferrous tool a hard surface conforming to the shape of said tool which comprises applying to said portion of the tool a liquid organic binder containing shellac and a layer of powdered material, said material being held in place by the organic shellac binder and said material comprising a carbohydrate, borax, a metallic matrix, and a carbide selected from the group consisting of the carbides of silicon, tungsten, molybdenum, chromium, tantalum, niobium, vanadium, titanium, zirconium, and boron, heating the coated tool surface while in contact with a protective atmosphere at a temperature and for a period of time sufficient to cause pyrolysis of the organic shellac binder, to fuse the borax and to reach the sweating point of the base metal as coated whereupon there is a fusion of the matrix of the surface layer and said ferrous tool portion at the interface, and allowing said coated portion to cool whereby said carbide component and said tool are tightly bonded together.

9. The method of applying to a selected portion of a ferrous article a hard surface conforming to the shape of said article which comprises applying to a surface of said portion of said article an alcoholic solution of shellac, subjecting said surface of said article to a curtain of falling powdered material, said material being held in place by the shellac solution and said material comprising tungsten carbide, borax and a hard metal alloy consisting substantially of cobalt and chromium and in which cobalt is the major constituent, heating the coated article surface while at a temperature and for a period of time sufficient to cause pyrolysis of the organic shellac binder, to fuse the borax and to reach the sweating point of the base metal as coated whereupon there is a fusion of the hard metal of the surface layer and said ferrous article portion at the interface, and allowing said coated article portion to cool whereby said powdered material and said article are tightly bonded together.

10. The method of applying to a selected portion of a ferrous tool a hard surface conforming to the shape of said tool which comprises applying to said portion of said tool an alcoholic solution of shellac and then passing said tool through a curtain of powdered material, said material being held in place by the shellac solution and said material comprising tungsten carbide, borax and a hard metal alloy containing cobalt and chromium, heating the coated tool surface while in contact with a nondetrimental atmosphere at a temperature and for a period of time sufficient to cause pyrolysis of the organic shellac binder, to fuse the borax and to reach the sweating point of the base metal as coated whereupon there is a fusion of the hard metal alloy of the surface layer and said ferrous tool portion at the interface, and thereafter allowing said coated tool portion to cool whereby said powdered material and said tool are tightly bonded together.

11. The method of applying to a selected portion of a ferrous article a hard surface conforming to the shape of said article which comprises applying to a surface of said portion of the article a liquid organic binder having the property of adhesion, sprinkling powdered material over the binder as a substantially uniform layer to produce a coated surface, said material being held in place by the liquid organic binder and said material comprising a metallic matrix and a carbide selected from the group consisting of the carbides of silicon, tungsten, molybdenum, chromium, tantalum, niobium, vanadium, titanium, zirconium and boron, heating the coated surface to a temperature and for a period of time sufficient to reach the sweating point of the base metal as coated whereupon there is a fusion of the matrix of the surface layer and the surface of said ferrous article at the interface, and thereafter allowing said coated article to cool whereby said carbide component and said article are tightly bonded together.

12. The method of applying to a selected portion of a ferrous article a hard surface conforming to the shape of said article which comprises applying to a surface of said portion of the article a liquid organic binder having the property of adhesion, passing said article through a curtain of powdered material to deposit a layer on the binder to produce a coated surface, said material being held in place by the liquide organic binder and said material comprising a metallic matrix and a carbide selected from the group consisting of the carbides of silicon, tungsten, molybdenum, chromium, tantalum, niobium, vanadium, titanium, zirconium and boron, heating the coated surface to a temperature and for a period of time sufficient to reach the sweating point of the base metal as coated whereupon there is a fusion of the matrix of the surface layer and the surface of said ferrous article at the interface, and thereafter allowing said coated article to cool whereby said carbide component and said article are tightly bonded together.

13. The method of applying to a selected portion of a ferrous article a hard surface conforming to the shape of said article which comprises applying to a surface of said portion of the article a liquid organic binder having the property of adhesion, sprinkling powdered material over the binder to produce a coated surface, said material being held in place by the liquid organic binder and said material comprising a metallic matrix and a carbide selected from the group consisting of the carbides of silicon, tungsten, molybdenum, chromium, tantalum, niobium, vanadium, titanium, zirconium and boron, continuing sprinkling said powdered material until sufficient material adheres to the binder to produce a coated surface and to reproduce thereon exactly the entire area and contour of the surface beneath the binder, removing any excess of powered material from said surface, heating the coated surface to a temperature and for a period of time sufficient to reach the sweating point of the base metal as coated whereupon there is a fusion of the matrix of the surface layer and the surface of said ferrous article at the interface, and thereafter allowing said coated article to cool whereby said carbide component and said article are tightly bonded together.

14. The method of applying to a selected portion of a ferrous article a hard surface conforming to the shape of said article which comprises applying to a surface of said portion of the article a liquid organic binder having the property of adhesion, passing said article through a curtain of powdered material falling on the binder to produce a coated surface, said material being held in place by the liquid organic binder and said material comprising a metallic matrix, borax, and a carbide selected from the group consisting of the carbides of silicon, tungsten, molybdenum, chromium, tantalum, niobium, vanadium, titanium, zirconium and boron, overcoating said coated surface with said powdered material, heating the coated surface to a temperature and for a period of time sufficient to reach the sweating point of the base metal as coated whereupon there is a fusion of the matrix of the surface layer and the surface of said ferrous article at the interface, and thereafter allowing said coated article to cool whereby said carbide component and said article are tightly bonded together.

15. The method of applying to a selected portion of a ferrous article a hard surface conforming to the shape of said article which comprises applying to a surface of said portion of the article a liquid organic binder having the property of adhesion, sprinkling powdered material over the binder by passing said article through a curtain of falling material to produce a coated surface, said material being held in place by the liquid organic binder and said material comprising a metallic matrix, borax, and a carbide selected from the group consisting of the carbides of silicon, tungsten, molybdenum, chromium, tantalum, niobium, vanadium, titanium, zirconium and boron, continuing sprinkling said powdered material until sufficient material adheres to the binder to produce a coated surface and to reproduce thereon exactly the entire area and contour of the surface beneath the binder, removing any excess of powdered material from said surface, heating the coated surface to a temperature and for a period of time sufficient to reach the sweating point of the base metal as coated whereupon there is a fusion of the matrix of the surface layer and the surface of said ferrous article at the interface, and thereafter allowing said coated article to cool whereby said carbide component and said article are tightly bonded together.

16. The method of producing an improved armored metal article having a thin, hard, flexible coating which has thinnesses up to about 0.015 of an inch, which has a fusion and interfacial bond located and interposed between the surface of the metal article and the coating and possessing tenaciousness and toughness capable of sustaining intense loads, which conforms exactly to the shaping of a regular and irregular underlying surface including horizontal, inclined and vertical surfaces and sharp corners, which has continuity of coverage over the selected coated area to be covered, and which possesses hardness and wear resistance even at high temperatures, the said method comprising wetting the surface of the selected area of the article to be covered with a liquid organic binder composition having the property of decomposing as an incident of the method and of a consistency such that it spreads evenly and at a uniform thickness of such surface upon contact therewith; coating the wetted surface with the armor material so finely powdered that it adheres readily thereto in a thin layer having the contour of the surface; said armor material comprising powdered metallic matrix alloy and powdered diamond substitute particles and having at least a part of said armor powder possessing the property when melted of bonding with the base; quickly raising by ambient heat the temperature of the armor powder to a fusion bonding temperature to remove the wetting composition and fusion bonding the powdered metallic matrix of the armor powder onto the surface of the metal article in a self-conforming fused layer having a substantially uniform thickness throughout and having the powdered diamond substitute particles dispersed and bonded therein; and thereafter allowing said coated article to cool whereby said improved metal article is produced with a self-conforming layer bonded thereto and the diamond substitute particles tightly bonded therein.

17. The method of producing an improved armored metal article having a thin, hard, flexible coating which has a thinness of about 0.001 of an inch to about 0.007 of an inch, which has a fusion and interfacial bond located and interposed between the surface of the metal article and the coating and possessing tenaciousness and toughness capable of sustaining intense loads, which conforms exactly to the shaping of a regular and irregular underlying surface including horizontal, inclined and vertical surfaces and shap corners, which has continuity of coverage over the selected coated area to be covered, and which possesses hardness and wear resistance even at high temperatures, the said method comprising applying to said surface a thin liquid film of an organic binder material having a consistency such that it coats evenly all parts of the surface and having a composition such that it adheres thereto, is chemically inert to the material of the surface and to the material of the armor, is compatible with all operating conditions of the process, and dissipates as an incident thereof; applying to the film of organic binder a coating of fine powder comprising a hard metallic matrix-forming material and powdered diamond substitute particles; continuing the application of the powder until sufficient powder adheres to the film of organic binder to reproduce thereon exactly the entire area and contour of the surface beneath the binder; removing any excess powder; heating the powder-coated article to dissipate the binder and melt the matrix material so that it bonds to said coated surface and to the diamond substitute particles forming therewith an armored layer exactly reproducing the entire area and contour of the underlying article surface; and thereafter allowing said coated article to cool whereby said improved armored article is produced with a self-conforming layer and the underlying surface of the article tightly bonded together and the diamond substitute particles dispersed in said layer.

18. The method of producing an improved armored metal tool having a thin, hard, flexible coating which has thinnesses up to about 0.015 of an inch, which has a fusion and interfacial bond located and interposed between the surface of the metal tool and the coating and possessing tenaciousness and toughness capable of sustaining intense loads, which conforms exactly to the shaping of a regular and irregular underlying surface including horizontal, inclined and vertical surfaces and sharp corners, which has continuity of coverage over the selected coated area to be covered, and which possesses hardness and wear resistance even at high temperatures, the said method comprising wetting the entire surface of the area of said metallic tool to be covered with an organic liquid binder composition decomposable by heat and of a consistency such that it flows evenly thereon upon contact to provide a film of organic binder that retains the exact configuration of the surface of the area which it covers; powdering the applied organic binder with a fine powder comprising an armor material containing a powdered metallic matrix material and powdered diamond substitute particles which powder adheres to the organic binder in a substantially thin layer conforming precisely to the configuration of the surface beneath the organic binder, at least a part of said armor material having the property when melted of bonding with said surface of said tool; heating the powdered surface to decompose the binder and melt particles of powdered metallic matrix directly upon the underlying surface of the tool evenly in a surface-bonded layer replacing the binder and thereby, to the same degree as the binder, retaining the configuration of the underlying surface; and thereafter allowing said armored tool to cool whereby said improved armored tool is produced with a surface-bonded layer and the underlying surface of the tool tightly bonded together and the diamond substitute particles dispersed and bonded therein.

19. The method of producing an improved armored metal article having a thin, hard, flexible coating which has thinnesses up to about 0.015 of an inch, which has a fusion and interfacial bond located and interposed between the surface of the metal article and the coating and possessing tenaciousness and toughness capable of sustaining intense loads, which conforms exactly to the shaping of a regular and irregular underlying surface including horizontal, inclined and vertical surfaces and sharp corners, which has continuity of coverage over the selected coated area to be covered, and which possesses hardness and wear resistance even at high temperatures, and said method comprising applying to a surface of said selected area of the metallic base of said metal article a film of liquid organic binder having the property of adhesion, of decomposing as an incident to the method and of a consistency such that it spreads evenly and with a substantially uniform thickness on said surface upon contact therewith; coating the said film of organic binder with a hard refractory metallic armoring material comprising a powdered hard refractory metallic matrix alloy and powdered diamond substitute particles, said armoring material being so finely powdered that it adheres in a relatively thin layer reproducing the entire area and contour of the surface beneath the binder; heating the said area of the metal article and the coated surface thereon to a temperature and for a period of time sufficient to reach the sweating point of the base metal whereupon the organic binder is subjected to pyrolysis causing volatile constituents to evaporate, burn and produce products of combustion and any residual constituents remaining as a carbonaceous residue whereupon there is a fusion of the metallic matrix alloy of the coated surface layer and the surface of said metal article at the interface; and thereafter allowing said metal article armored with said hard refractory metallic material containing diamond substitute particles to cool whereby said hard refractory metallic matrix alloy and said metallic base are tightly bonded together with the diamond substitute particles dispersed therein.

20. The method of producing an improved armored metal article having a thin, hard, flexible coating which has a thinness of about 0.001 of an inch to about 0.015 of an inch, which has a fusion and interfacial bond located and interposed between the surface of the metal article and the coating and possessing tenaciousness and toughness capable of sustaining intense loads, which conforms exactly to the shaping of a regular and irregular underlying surface including horizontal, inclined and vertical surfaces and sharp corners, which has continuity of coverage over the selected coated area to be covered, and which possesses hardness and wear resistance even at high temperatures, the said method comprising applying to a surface of said selected area of the metallic base of said metal article a film of liquid organic binder having the property of adhesion, of decomposing as an incident to the method and of a consistency such that it spreads evenly and with a substantially uniform thickness on said surface upon contact therewith; passing said metal article with said film of liquid organic binder thereon through a curtain of falling powdered hard refractory metallic armoring material comprising powdered hard refractory metallic matrix alloy, borax and diamond substitute particles; continuing passing said metal article through said curtain of falling powdered material until sufficient armoring material adheres to the organic binder to form a relatively thin layer reproducing the entire area and contour of the surface beneath the binder including any square corner; removing any excess of powdered material from said surface; heating the selected area of the metal article and the coated surface thereon to a temperature and for a period of time sufficient to reach the sweating point of the base metal whereupon the borax is fused and the organic binder is subjected to pyrolysis causing volatile constituents to evaporate, burn and produce products of combustion and any residual constituents remaining as a carbonaceous residue whereupon there is a fusion of the metallic matrix alloy of the coated surface layer and the surface of said metal article at the interface, and thereafter allowing said metal article armored with said hard refractory metallic material containing said diamond substitute particles to cool whereby said hard refractory metallic matrix alloy and said metallic base of said metal article are fused together in a self-conforming layer of substantially uniform thickness with the diamond substitute particles tightly bonded therein.

21. The method of producing an improved armored metal article having a thin, hard, flexible coating which has a fusion and interfacial bond located and interposed between the surface of the metal article and the coating and possessing tenaciousness and toughness capable of sustaining intense loads, which conforms exactly to the shaping of a regular and irregular underlying surface including horizontal, inclined and vertical surfaces and sharp corners, which has continuity of coverage over the selected coated area to be covered, and which possesses hardness and wear resistance even at high temperatures, the said method comprising applying to a surface of said selected area of the metallic base of said metal article a film of liquid organic binder having the property of adhesion, of decomposing as an incident to the method and of a consistency such that it spreads evenly and with a substantially uniform thickness on said surface upon contact therewith; sprinkling over the said film of liquid organic binder powdered hard refractory metallic armoring material comprising powdered hard refractory metallic matrix alloy, borax and diamond substitute particles, said armoring material being so finely powdered that it adheres in a relatively thin layer reproducing the entire area and contour of the surface beneath the binder; heating the area of the metal article and the coated surface thereon to a temperature and for a period of time sufficient to reach the sweating point of the base metal whereupon the borax is fused and the organic binder is subjected to pyrolysis causing volatile constituents to evaporate, burn and produce products of combustion and any residual constituents remaining as a carbonaceous residue whereupon there is a fusion of the metallic matrix alloy of the coated surface layer and the surface of said metallic base of said metal article at the interface; and thereafter allowing said metal article armored with said hard refractory metallic material containing said diamond substitute particles to cool whereby said hard refractory metallic matrix alloy and said metallic base of said metal article are tightly bonded together in a self-conforming layer with the diamond substitute particles dispersed therein.

References Cited in the file of this patent

UNITED STATES PATENTS

| | | |
|---|---|---|
| 242,649 | Howes | June 7, 1881 |
| 509,280 | Ash et al. | Nov. 21, 1893 |
| 1,197,695 | Watkins | Sept. 12, 1916 |
| 1,565,495 | Pfeil | Dec. 15, 1925 |
| 1,613,942 | Davies | Jan. 11, 1927 |
| 1,733,241 | Scott | Oct. 29, 1929 |
| 1,791,968 | Morgan | Feb. 10, 1931 |
| 1,824,166 | Morgan | Sept. 22, 1931 |
| 1,899,569 | Howe | Feb. 28, 1933 |
| 1,922,254 | McCulloch | Aug. 15, 1933 |
| 2,003,019 | Strobel | May 28, 1935 |
| 2,104,370 | Johansson | Jan. 4, 1938 |
| 2,190,237 | Koehring | Feb. 13, 1940 |
| 2,205,864 | Schwarzkopf | June 25, 1940 |
| 2,258,894 | Janco | Oct. 14, 1941 |
| 2,261,228 | Cockrum | Nov. 4, 1941 |
| 2,295,702 | Wissler | Sept. 15, 1942 |
| 2,326,403 | Snyder | Aug. 10, 1943 |
| 2,408,515 | Hopkins | Oct. 1, 1946 |
| 2,414,231 | Kraus | Jan. 14, 1947 |
| 2,455,183 | Lobdell | Nov. 30, 1948 |
| 2,694,647 | Cole | Nov. 16, 1954 |

FOREIGN PATENTS

| | | |
|---|---|---|
| 474,064 | Great Britain | Jan. 17, 1936 |